(12) United States Patent
Hanson

(10) Patent No.: US 7,118,357 B2
(45) Date of Patent: Oct. 10, 2006

(54) WATER SUPPLY SYSTEM

(76) Inventor: Dwight Eugene Hanson, 1285 County Rd., H, Ithaca, NE (US) 68033

( * ) Notice: Subject to any disclaimer, the term of this patent is extended or adjusted under 35 U.S.C. 154(b) by 625 days.

(21) Appl. No.: 10/618,866

(22) Filed: Jul. 14, 2003

(65) Prior Publication Data
US 2004/0076524 A1    Apr. 22, 2004

Related U.S. Application Data

(63) Continuation-in-part of application No. 10/059,679, filed on Jan. 30, 2002, now Pat. No. 6,592,342.

(51) Int. Cl.
*F04B 17/00* (2006.01)
(52) U.S. Cl. .................................. 417/423.3
(58) Field of Classification Search ............. 417/38, 417/44.2, 423.1, 423.14, 423.3, 522
See application file for complete search history.

(56) References Cited

U.S. PATENT DOCUMENTS

| | | | |
|---|---|---|---|
| 2,689,611 A | | 9/1954 | Martinson |
| 3,976,131 A | | 8/1976 | Woodford et al. |
| 5,281,101 A | * | 1/1994 | Bevington ............... 417/38 |
| 5,988,984 A | | 11/1999 | Austin |
| 6,109,296 A | | 8/2000 | Austin |
| 6,264,431 B1 | | 7/2001 | Triezenberg |
| 6,276,658 B1 | | 8/2001 | Austin |
| 6,328,071 B1 | | 12/2001 | Austin |
| 6,349,765 B1 | | 2/2002 | Meyers et al. |
| 6,592,342 B1 | * | 7/2003 | Hanson ............... 417/423.3 |

* cited by examiner

*Primary Examiner*—Tae Jun Kim
*Assistant Examiner*—Samuel E. Belt
(74) *Attorney, Agent, or Firm*—Vincent L. Carney

(57) ABSTRACT

A water supply system has its housing and pressure tank sized so that the pressure tank fits within the housing, thus avoiding the need for another separate opening in the ground for the pressure tank. With this arrangement, there is less work in installation of the system and in maintaining the system. A control box for the system can be in the housing near the top where it is accessible or it can be separate. Preferably, the pump will be driven by a variable speed pump or a stop cycle valve will be used. Preferably, the pressure tank has a capacity of less than 40 gallons and the housing has an enlarged portion and a reduced portion with the pressure tank being mounted within said enlarged portion of said housing. The enlarged portion of the housing has an enlarged portion bottom surface and the reduced portion of said housing has a reduced portion bottom surface with the reduced portion of said housing being integrally formed with said enlarged portion bottom surface and extending downwardly therefrom and the conduit is adapted to be connected to a pumping system within a well casing and extends through the reduced portion bottom surface for supplying water to the pressure tank.

8 Claims, 5 Drawing Sheets

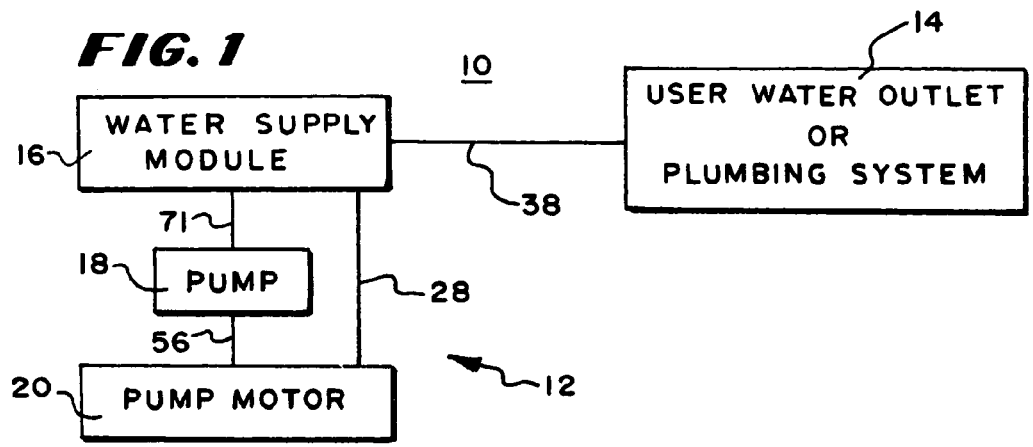
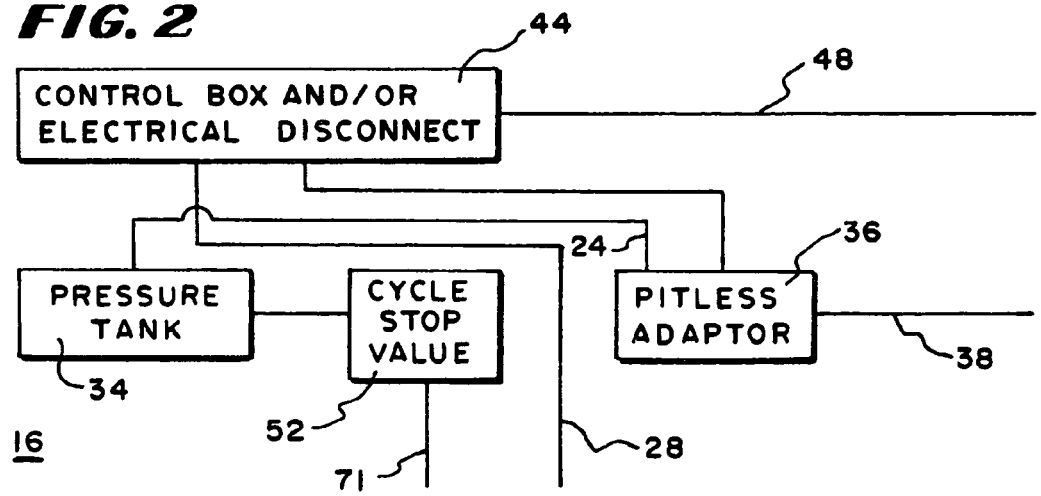
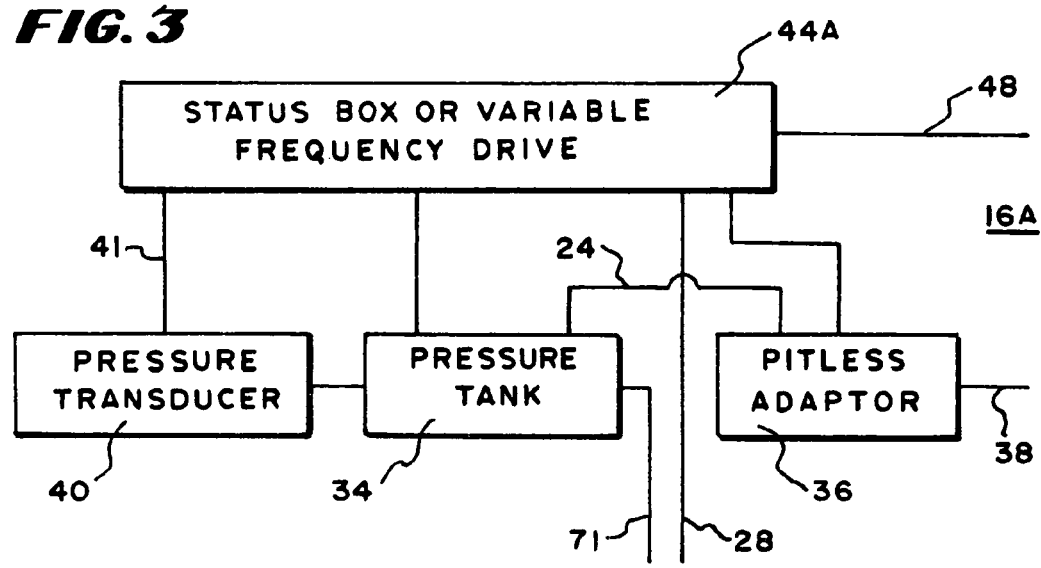

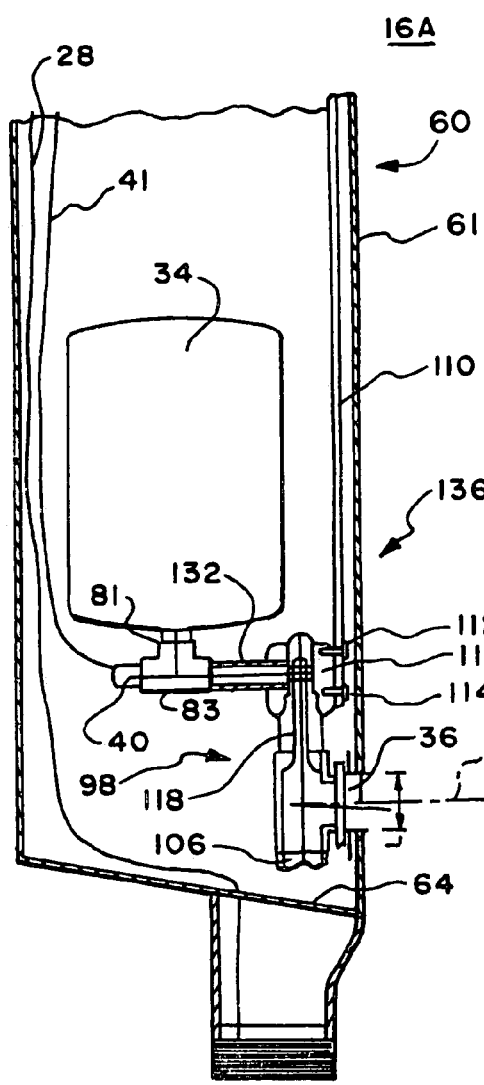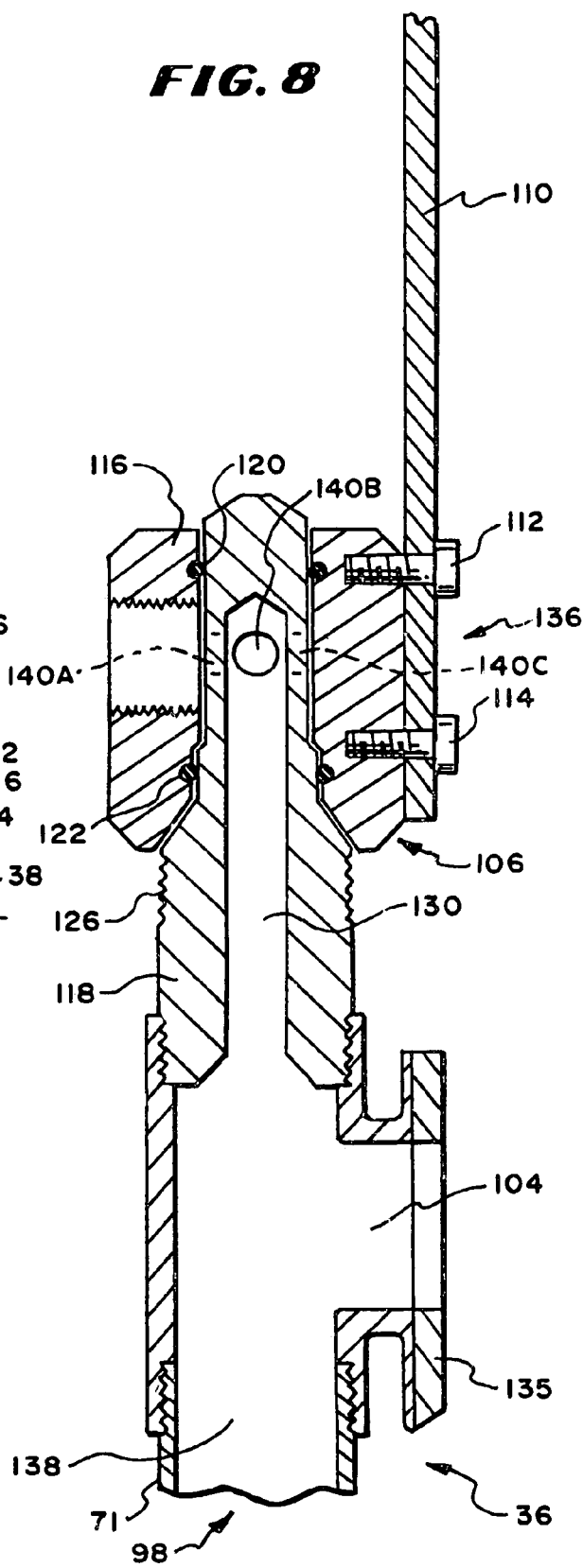

FIG. 9
FIG. 10
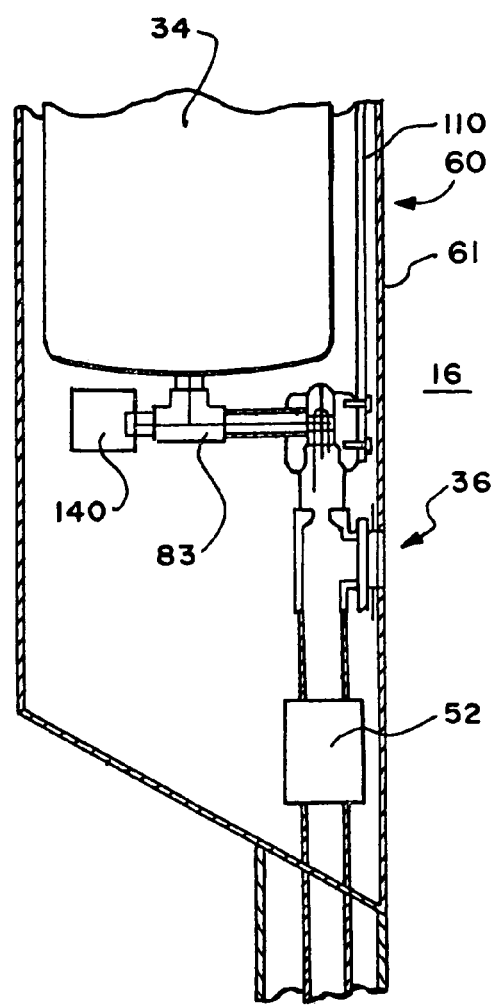
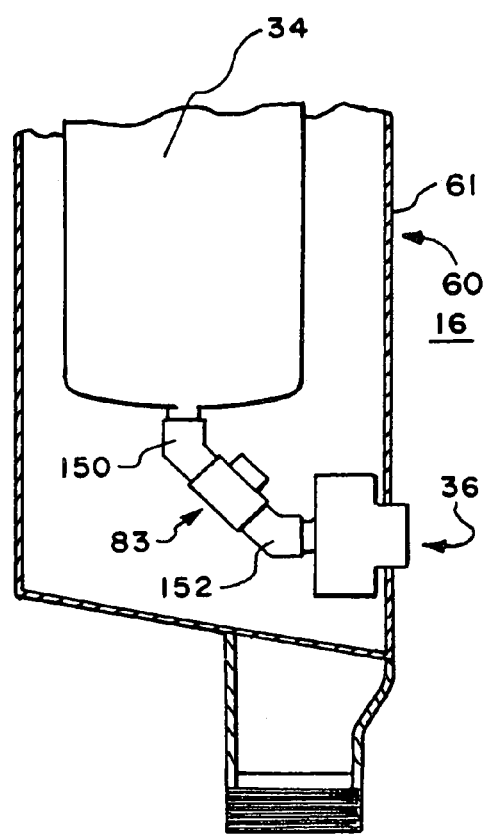

WATER SUPPLY SYSTEM

RELATED CASES

This case is a continuation in part of U.S. application Ser. No. 10/059,679 filed Jan. 30, 2002 now U.S. Pat. No. 6,592,342 in the name of Dwight Eugene Hanson.

BACKGROUND OF THE INVENTION

This invention relates to water supply systems.

It is known in the water supply system art to have a pressurized water tank communicating with a well pipe through a submersible pump. In these systems, the pump is controlled by a sensing system to maintain pressure in the water system. The water may be supplied to households or to other plumbing or water systems.

In one prior art water supply system of this type, the pressure tank and associated equipment are mounted in a pit. The well casing extends upwardly into the bottom of the pit and connected there to pipes leading to the pressure tank where access is available to the connection. This arrangement has a serious disadvantage in that the pit accumulates waste water and the like and may permit contaminants to drain into the well.

In another class of prior art water supply systems known as pitless systems, this disadvantage is avoided by using a pitless unit or pitless adapter which is a unit that connects to the well casing, usually below the frost line, and conducts water to a pressure tank, protects the water from freezing and prevents the entry of contaminants. In a common type of pitless system, the pitless unit rests on the well casing below ground and extends upwardly to the surface. This type of pitless unit is approximately the same size as the well casing or one nominal size larger in the case of a spool type outlet to the plumbing system of the user. Usually, the pumps are driven by a constant speed motor that operates in duty cycles, has relatively constant flow rates depending on the efficient running speed of the pump motor but has different frequencies of the cycles of pumping and not pumping or durations of the cycles of pumping and not pumping that depend on the demand for water. The pressure tank is mounted separately from the well such as in a home or separate opening in the ground below the frost line or building near the well. The pressure tanks are sufficiently large to provide water under adequate pressure under different demand conditions with the same flow rate from the pumps but different frequencies of cycles or different duty cycles.

It is known to use variable speed pumps in water supply systems. Moreover, it is known to improve existing systems with a pit by sealing the pit with an enlarged housing of sufficient size to fill the pit, but these prior art retrofit systems also have large pressure tanks and the pressure tanks are mounted separately from the well.

This type of prior art water supply module has several disadvantages such as for example: (1) the size of pressure tank needed to satisfy demand for some plumbing systems is relatively large; (2) a separate building or space in the building receiving water from the well or other underground opening is needed for the pressure tank; and (3) they are relatively expensive to install, under some circumstances, because the pressure tank is located or housed at a location spaced from the well.

SUMMARY OF THE INVENTION

Accordingly, it is an object of the invention to provide a novel water supply system.

It is a still further object of the invention to provide a novel water supply system that is economical to install.

It is a still further object of the invention to provide a water supply system that is economical and convenient to maintain and use.

It is a still further object of the invention to provide an economical water supply system.

In accordance with the above and further objects of the invention, a water supply system includes a water supply module that cooperates with a variable flow-rate pumping system to provide water from a well to a plumbing system such as a plumbing system of a building or a stand-alone water source in a park or the like. The variable flow rate pumping system can be any type such as a pump driven by a variable speed motor, the speed of which varies with an input signal related to water pressure or a constant speed motor driving a pump with the flow rate to the pressure tank being controlled by a cycle stop valve and a pressure switch that responds to pressure in the system. The water supply module includes a housing or casing, a pressure tank and a pressure sensor or cycle stop valve connected to maintain pressure in the system by supplying water to the pressure tank at a higher rate when demand is greater. The casing of the water supply module is larger than the size of the well casing by more than a nominal size and is sufficiently large to receive the pressure tank within it. The drop tube extends through an opening in a bottom-closing member into the well casing. The closing member is required because of the larger size of the housing but may have the disadvantage of receiving condensation. Preferably some measures are taken to avoid rust and corrosion from moisture in the water supply module.

The pressure tank is dimensioned so that it fits within the water supply module housing and preferably sufficiently small to provide clearance in the water supply housing for other components to be inserted from above. For example, the clearance may be sufficient to permit lowering of the drop tube and pumping system from above. In the preferred embodiment, a pressure tank with a volume in the range of one to 15 gallons and still more preferably in the range of 2.2 to 4.5 gallons is used.

To prevent corrosion or contamination of the water from drainage in the water supply module, the water supply module: (1) is closed to prevent water from outside the module from entering the module; and (2) the water supply module includes a suitable means for removing water caused by condensation or leakage such as for example a desiccant or a sloped bottom member which may permit collection of moisture and drainage into the well and may be made of special materials to prevent rust and growths from occurring in the inside of the housing for the water supply module. The top of the module is closed by a cover to prevent contaminants from entering the housing and being carried into the well with moisture.

An opening in the bottom member of the water supply module housing, and in some embodiments, a tube that extends from the water supply housing to rest on and preferably seal against the well casing have a sufficient diameter for the drop tube to pass through them and have enough clearance for the pump and the pump motor to pass through. The opening may offset from the side of the water supply module housing to provide sufficient clearance between the pump and the pump motor when being lowered and the pressure tank, water supply module housing wall and well casing. Preferably, the clearance is sufficient to satisfy the requirements of all state agencies and organizations in the states such as the PAS 1997 standard. Slip joints are provided to permit the pressure tank to be inserted and removed from the water supply module from above without disturbing the pumping system or isolation valve leading to the plumbing system.

As can be understood from the above description, the water supply system of this invention has several advantages, such as: (1) it can be easily installed from the top of the well; (2) it can be easily maintained because the parts are easily removable through the top of the well or the well casing; and (3) it is economical in construction, installation and maintenance.

SUMMARY OF THE DRAWINGS

The above noted and other features of the invention will be better understood from the following detailed description when considered in conjunction with the drawings, in which:

FIG. 1 is a block diagram of a water supply system in accordance with an embodiment of the invention;

FIG. 2 is a block diagram of an embodiment of water supply module that may be part of the embodiment of FIG. 1;

FIG. 3 is a block diagram of another embodiment of water supply module that may be part of the embodiment of FIG. 1;

FIG. 7 is a fragmentary longitudinal sectional view of a portion of another embodiment of water supply module forming a part of the water supply system of FIG. 1;

FIG. 8 is a fragmentary elevational sectional view of a connector for installing the pressure tank in a module in accordance with an embodiment of the invention;

FIG. 9 is a fragmentary elevational sectional view of another embodiment of water supply module;

FIG. 10 is a fragmentary elevational sectional view of still another embodiment of water supply module;

DETAILED DESCRIPTION

Figure 4:
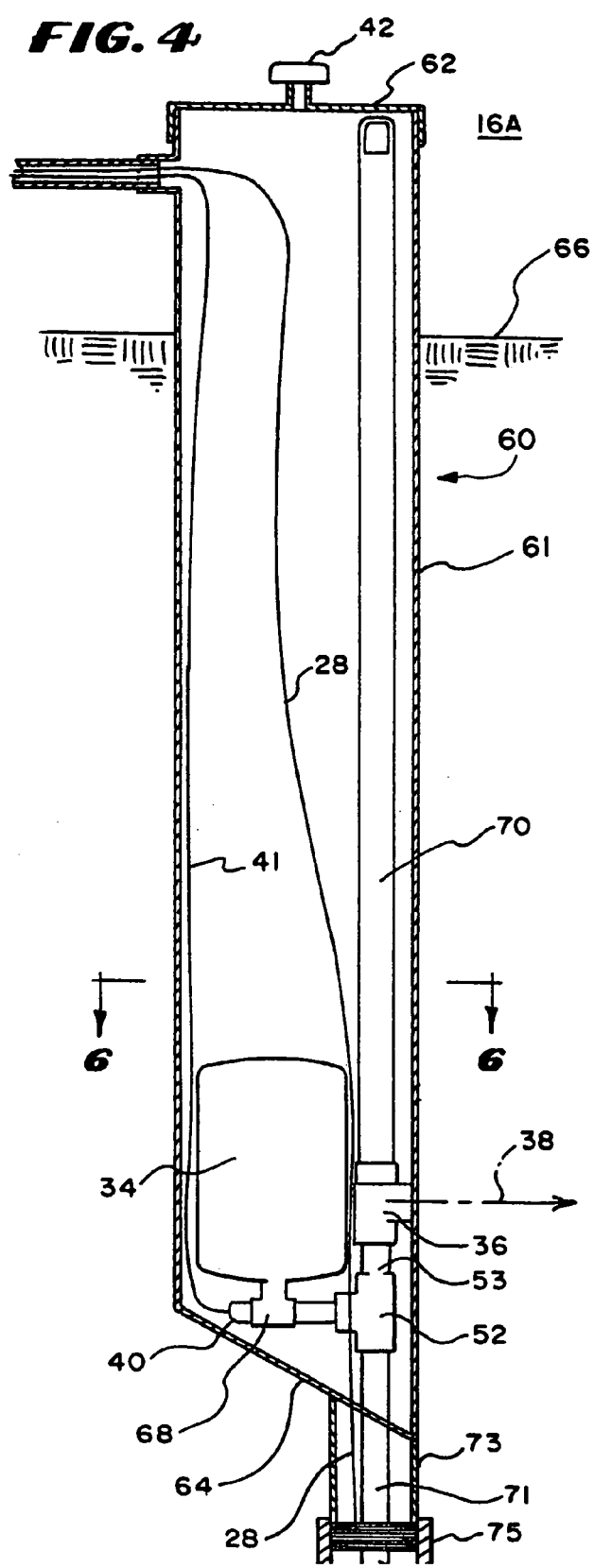
FIG. 4 is a longitudinal sectional view of one embodiment of water supply module forming a part of the water supply system of FIG. 1.

In FIG. 1, there is shown a block diagram of a water supply system 10 having a pumping station 12 and a plumbing system 14. The pumping station 12 is principally located within a well casing and supplies water through one or more conduits 38 to the user water outlet or plumbing system 14. The plumbing system 14 may be that of a household or a separate stand-alone outlet or the plumbing system of a large building or any other facility requiring water.

The pumping station 12 includes a water supply module 16, a pump 18 and a pump motor 20. The pump 18 and pump motor 20 are submersible and are within the liquid in the well casing to pump water upwardly to the water supply module 16. The water supply module 16 includes the pressure tank, the pitless adapter or pitless unit, and may include gages, control boxes, status boxes, transducers and the like. While the water supply module 16 is shown in FIG. 1 as a separate integrated unit separate from the pump 18 and the pump motor 20, some components such as a status or control box may be at different locations within the pumping station 10. The pump motor 20 receives power through electrical cabling 28 and drives the pump 18 through a coupling 56.

In the embodiment of FIG. 1, the water supply module housing is sufficiently large in diameter to accommodate the pressure tank and drop pipe within it. A control unit is readily accessible, being mounted adjacent to the pumping station housing or within the top of the pumping station housing. In the preferred embodiment, the pressure tank has a capacity of approximately 2.2 to 4.5 gallons of water but should not be more than 40 gallons nor less than one gallon. The preferred dimensions of the tank are 8 to 10 inches in diameter by 14 to 18 inches in length but should not be smaller in diameter than 6 inches nor larger than 16 inches. The height can be selected for desired capacity and is not critical. The tank dimensions are significant because of the need to fit the pressure tank into the module housing. With this arrangement of module and pressure tank, a separate underground compartment is not needed for the pressure tank thus simplifying installation and maintenance.

In FIG. 2, there is shown a block diagram of an embodiment of water supply module 16 in accordance with the invention including a control box and/or electrical disconnect 44, a pressure tank 34, a cycle stop valve 52, and a pitless adapter 36. These components are arranged so that: (1) the control box and/or electrical disconnect 44 containing the controls and readable gages, if any, is conveniently located for use and maintenance; (2) the pitless adapter 36, the pressure tank 34, the cycle stop valve 52, the pump 18 (FIG. 1) and a drop tube 71 can be mounted from the surface of the ground and are readily available for inspection, maintenance, adjustment and replacement if necessary; and (3) the pressure tank 34 can be mounted in the housing of the water supply module without requiring a separate building or space in an existing building such as the building with the plumbing system or an extra below ground opening to be excavated.

To permit installation from above ground, one embodiment of water supply module includes one or more slip joints (not shown in FIG. 2) for connecting the pitless adapter 36 to the well casing and to the pressure tank 34. The pitless adapter 36 is connected to and communicates with the plumbing system 14 (FIG. 1) and is connected to the pressure tank 34 through a conduit 24 and a conventional isolation valve to permit the flow of water from the pressure tank 34 to the plumbing system 14 (FIG. 1) and to prevent contamination of the water supply. The pressure tank 34 receives water from the pump 18 (FIG. 1) and the cycle stop valve 52. The cycle stop valve 52 is a conventional unit that receives water through conduit 71 and controls the flow rate of liquid into the pressure tank 34 from the pump 18 to enable the pressure tank 34 to receive water as needed to maintain water pressure in the user water outlet or plumbing system 14 (FIG. 1). The control box and/or electrical disconnect 44: (1) receives power on conductor 48; and (2) supplies power to the pump motor 20 (FIG. 1) through conductor 28. The pump motor 20 (FIG. 1) may operate on a fixed cycle or continuously since the cycle stop valve 52 controls pressure in the pressure tank 34. The cycle stop valve 52 receives water from the pump 18 (FIG. 1) through conduit 71 and supplies it to the pressure tank 34 at a rate to maintain substantially constant water pressure. The control box and/or electrical disconnect 44 may be positioned outside of the module housing or in the module at the top of the module housing in a readily accessible location. A pressure switch (not shown in FIG. 2) may be incorporated to detect over-pressure or to turn the pump motor 20 on and off but is not necessary in this embodiment.

In FIG. 3, there is shown a block diagram of another embodiment of water supply module 16A in accordance with the invention in which the components that are the same as those shown in the embodiment of FIG. 2 have the same reference number and the components that differ are followed by the suffix "A". It includes as its principal parts, a status box or variable frequency drive 44A, the pressure tank 34, a pressure transducer 40, and the pitless adapter 36. As in the case of the embodiment of FIG. 2: (1) the status box or variable frequency drive 44A containing the controls and readable gages, if any, is conveniently located for use and maintenance; and (2) the pitless adapter 36, the pressure tank 34, the pump 18 (FIG. 1) and the drop tube 71 can be mounted from the surface of the ground. It functions in substantially the same manner as the embodiment of FIG. 2, but is adapted to be used with a variable speed motor driving a pump to provide a variable flow rate pumping action rather than being adapted to cooperate with a cycle stop valve.

In this arrangement, the pressure transducer 40 supplies signals to the status box or variable frequency drive 44A that compares these signals with reference values representing normal pressure for the pressure tank 34. The deviation results in a signal to the variable speed pump motor drive (FIG. 1) to adjust its speed and bring the pressure in the pressure tank 34 to the normal value. This type of status box or variable frequency box is known in the motor control art and is in itself not part of the invention.

In FIGS. 1–3, the cycle stop valve 52 is a pump control valve that makes variable flow out of a standard constant speed pump so that it supplies liquid upon demand to the pressure tank 34. The preferred embodiment is a model CSVI Pump supplied by Cycle Stop Valve, Inc., 10221 CR6900 Lubbock, Tex. 79407. Other suitable valves are manufactured by Jacuzzi Aqua-Genie 200, or Redjacket Hydroservant. A variable speed motor drive may be used instead of a cycle valve stop as illustrated in FIG. 3.

In FIG. 4, there is shown a longitudinal sectional view of a portion of the water supply module 16 for an embodiment that has the advantages of not having an open pit but still using many off-the-shelf parts. It includes a water supply module housing 60, the pitless adapter 36, an isolation valve and an outlet conduit 38. The module housing 60 includes housing side walls 61, a top plate 62, and an angled bottom plate 64, with the housing being partly below ground level 66. In the embodiment of FIG. 4, the housing 60 is generally cylindrical with an upper flat surface having a diameter of one foot ¾ inch and a height of 5½ feet, one foot of which is intended to remain above ground. The bottom end includes a tubular section 73 opening into the angled bottom plate 64 with a nipple on its end to connect to the well casing 75. However, the inner diameter of the module housing 60 should be at least ten inches and should have a height of at least two feet.

In the embodiment of FIG. 4, the tubular section 73 has a diameter of approximately four inches but the diameter is chosen to combine with the well casing 75 and may have any size that matches a well casing. It should be at least two inches in diameter. It extends through the angled plate 64 which is shaped to fit at a 60 degrees angle with the vertical and thus has a long axis of 14¾ inches and a short axis of 12¾ inches. It is a 3/16 inch steel plate. The housing 60 has a diameter sufficiently large so that the pressure tank 34 fits within it, thus avoiding a separate opening or housing for the pressure tank 34. A drop tube 71 extends through the tube 73 and is coupled to the pump 18 (FIG. 1) to supply water to the pressure tank 34. Preferably, the pressure tank 34 is below the frost line. A lifting pipe 70 is threaded into the top of the standard pitless adapter 36 or otherwise fastened to it or made a part of it. A connecting pipe 53 connects the bottom of the pitless adapter 36 to the top of a standard brass tee-joint with the tube 71 connected to its bottom. Thus the tube 71 can be lowered into place to communicate with the outlet 38 and the pressure tank 34 through "T-joints" 52 and 68.

With this arrangement, the module casing can be installed with a pitless adapter connected to the outlet 38 to the plumbing system 14 (FIG. 1) using standard parts. An externally threaded pipe can be threaded into the pitless adapter if it has a single outlet to connect to threaded member 53 for the T-joint or a connector (not shown in FIG. 4) can be connected to the top outlet of the pitless adapter and the end of the stand pipe 70 threaded into it to permit the tube 71 and pressure tank 34 to be lowered into the module. The pitless adapter can be a Maass Midwest LD-S-12 pitless adapter and the pressure tank can be a 2 gallon WX-101 Well-X-Trol Pressure Tank.

Figure 5:
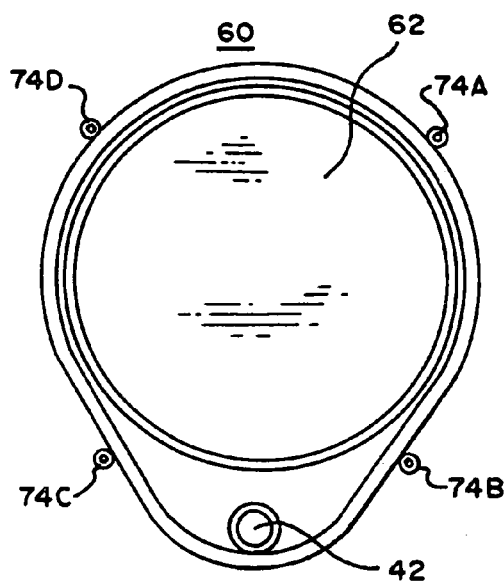
FIG. 5 is a plan view of the lid of the water supply module of FIG. 4.

In FIG. 5 there is shown a plan view of the water tight cap 62 of the housing 60 of FIG. 4. It may be a PC-12 Maass Midwest Cap but in the preferred embodiment, the cap is a Royer Well Cap mounted to the housing 60 by a plurality of hex head cap screws 74A–74D and having an air vent 42. The preferred embodiment is aluminum and sealed with a cap O-ring. It is 10¾ inches or 12¾ inches and sold by Maass Midwest at 11213 Dundee Road, Huntley, Ill. 60142-0547 or Royer Quality Castings Inc., 380 South Reading Avenue (Rear), Boyertown, Pa. 19512-1812. However, the cap may be within the range of 10 to 18 inches in diameter depending on the diameter of the module side wall.

Figure 6:
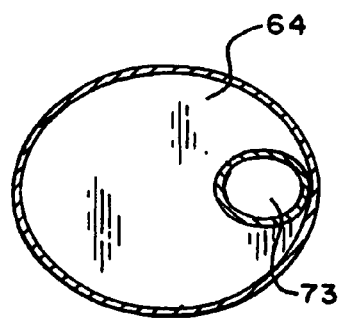
FIG. 6 is a sectional view taken through lines 6—6 of FIG. 4.

As best shown in the sectional view of FIG. 6, taken through lines 6—6 of FIG. 4, the steel pipe 73 extends through the steel plate 64 and is welded thereto. This steel plate 64 is at an angle to cause liquid to flow through its bottom end, where it may drain from the housing of the water supply module.

In FIG. 7, there is shown a fragmentary longitudinal sectional view of a portion of another embodiment of water supply module 16A forming a part of the water supply system of FIG. 1. In this embodiment, the pressure tank 34 has a pressure transducer 40 mounted to communicate with the pressure tank 34 at a T-joint 83 to generate signals and transmit them to the status box or variable frequency drive 44A (FIG. 3) through conductor 41 for controlling the speed and on-off cycle of the variable speed motor driving the variable flow rate pump. No cycle stop valve is needed since the variable speed motor is controlled to maintain the pressure at its rated level under the control of feedback signals generated in the status box or variable frequency drive 44A (FIG. 3) in response to the preset value of pressure and the signals indicating actual pressure from the pressure transducer 40. In FIG. 7, the pressure tank 34 communicates through the T-joint 83 with the transducer 40 and with a pipe 132. The pipe 132 communicates with a pull-up assembly 136 to permit fluid connection between the inside of the pressure tank 34 and the plumbing system 14 (FIG. 1) through the pitless adapter 36 and a pressure tank connector 118 as will be explained in greater hereinafter.

The pull-up assembly 136 includes a pull-up strap 110 mounted by bolts 112 and 114 to a slip joint member 116 to which the pipe 132 is mounted so as to permit the pressure tank 34, the T-joint 83, the pressure transducer 40, and slip joint member 116 to be lowered onto a connecting pipe 106 which is mounted to the pitless adapter 36. The pitless adapter 36 is mounted to the housing 60 of the module 16A in a manner similar to that of the embodiment of FIG. 4 except that it is unthreaded and the slip joint member 116 holding the pressure tank 34 and associated pipes and transducer to be lowered onto the pressure tank connector 118 rather than having the pressure tank 34 and associated pipes already mounted to the drop tube 71 through the T-joint 52 and connecting member 53 as shown in the embodiment of FIG. 4. In both embodiments, the drop tube has mounted to it the pump for pumping water from the well.

The pitless adapter 36 may be an adapter of the type described in U.S. Pat. No. 2,689,611 to Martinson, filed Jun. 19, 1958 and granted Sep. 21, 1954 connected as described in the aforesaid patent. It may be a model LD-S-12, part number 952112 Dicken Pitless Adapter available from the above mentioned Maass Midwest Company. This adapter 36 may be used in connection with the water supply module 16 of FIG. 4 as well as with the water supply module 16A of FIG. 7 connected as shown in FIG. 8 to form a sealing connection around the well casing 75 and provide a means for connecting with the stand pipe 70. In both the embodiment 16 of FIG. 4 and the embodiment 16A of FIG. 7, the stand pipe 70 may be connected directly to the connecting tube 106 by threading it therein although, as will be shown hereinafter, the stand pipe 70 may also be connected to a pressure tank connector 118 (FIG. 7) which forms a part of the pull-up assembly 136 (FIG. 7) as will be described hereinafter. In both cases, the pitless adapter 36 permits a sealing communication between the pressure tank 34 and the plumbing system 14 (FIG. 1) through the well casing 75 and permits the connecting tube 106 to be fitted to the pitless adapter 136. In the embodiment 16 of the water supply module shown in FIG. 4, the connection to the pressure tank 34 is below the connecting tube 106 whereas in the embodiment of FIG. 7, it is connected above the connecting tube 106.

In FIG. 8, there is shown an alternate embodiment of FIG. 7 utilizing the pitless adapter 36 and the slip joint 106. However, in this embodiment, the pull-up assembly 136 is shown assembled to the slip joint 106. The pull-up assembly includes the slip joint member 116, the slip joint 106 and the pull strap 110. The pull up strap 110 is mounted by the bolts 112 and 114 to the first slip joint member 116 and the slip joint member 116 fits sealingly against the pressure tank and pitless adapter connection 118 to provide a through internal channel 130 between an internal chamber 138 of the tee-connector 98 and a channel 104 which communicates with a pressure tank 34 (FIG. 7) through the pipe 132 (FIG. 7). The channel 130 within the slip joint member 116 near its top includes a recessed groove with O-ring 120 above the recessed portion and O-ring 122 below the recessed portion to form a sealing connection against the pressure tank connector 118. Beveled portions formed complementary between the slip joint member 116 and the pressure tank connector 118 form a tight seal between the two, held in place by the weight of the pressure tank 34 (FIG. 7). Within the recessed portion are a plurality of openings, openings 140A–140C being shown in FIG. 10, through which fluid from the pressure tank 36 (FIG. 7) can flow in through an inlet 134, through the openings such as 140A–140B in the recessed portion into the pressure tank 34 (FIG. 1) and through the channels 130, 138, and 104. A flange 135 cooperates with a groove in the pitless adapter described in the aforesaid U.S. Pat. No. 3,976,131, in the manner described therein. The disclosure of U.S. Pat. No. 3,976,131 is incorporated herein by reference.

An externally threaded portion 126A around the pressure tank connector 118 permits connection of the stand pipe 70, if desired, so that the pressure tank connector 118 may be threaded in place prior to being lowered with the slip joint 106 and the drop tube 71 onto the adapter 36 as an alternative to threading the stand pipe 70 into the threads of the slip joint 106 directly. When the slip joint 106 is in place, the pressure tank 34 and associated tubing attached to the slip joint member 116 can be lowered by the strap 110 onto the pressure tank connector 118. The strap 110 may be permanently extended to the top of the module so that the pressure tank and associated tubing may be pulled upwardly for maintenance by the strap 110 when desired.

In FIG. 9, there is shown a fragmentary, elevational sectional view of a module 16 having a large pressure tank 34, a pressure transducer 140, a pull up strap, a T-joint 83, a first slip joint 116 (FIG. 7), a pitless adapter 36 and a cycle stop valve 52. This embodiment is similar to the embodiment of FIG. 4, but uses a cycle stop valve rather than a variable-speed pump and thereby should have a larger pressure tank to accommodate the time between filling.

In FIG. 10, there is shown a fragmentary, elevational, sectional view of a module 16 similar to the module of FIG. 4 but having angled connecting pipes 150 and 152 connecting the T-joint 83 to the pressure tank 34 and pitless adapter 36. With this arrangement a slip joint is unnecessary. A small pressure tank 34 is mounted directly to the pitless adapter and to a pull-up assembly for pulling the tank and adapter from the module.

Figure 11:
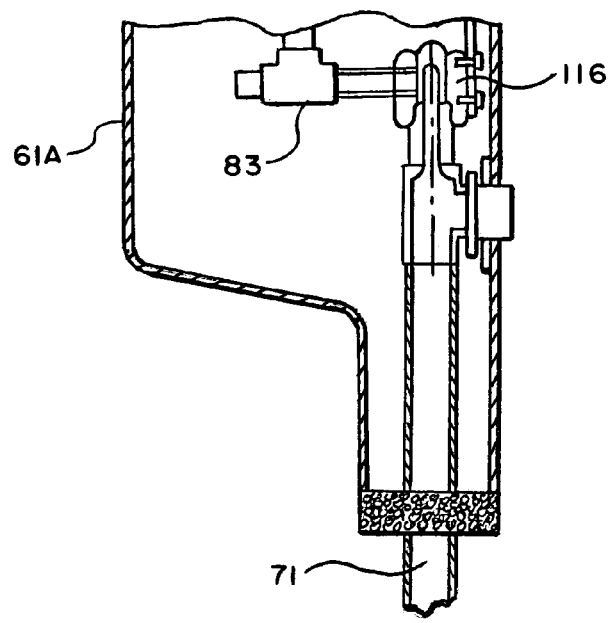
FIG. 11 is a fragmentary elevational simplified sectional view of an embodiment of the invention having a housing wall different from that of the housing wall of FIG. 4.

In FIG. 11, there is shown a fragmentary, elevational, simplified, sectional view of a module 16 similar to the module of FIG. 4 but It instead of the module housing 60 with angled bottom plate 64 the module housing includes an integrally formed side wall, bottom and reducer end 61A with the reducer end being PVC or steel and swedged or forged from the same tube of PVC or steel, or if PVC, the reducer may be integrally molded with the bottom and side walls.

Figure 12:
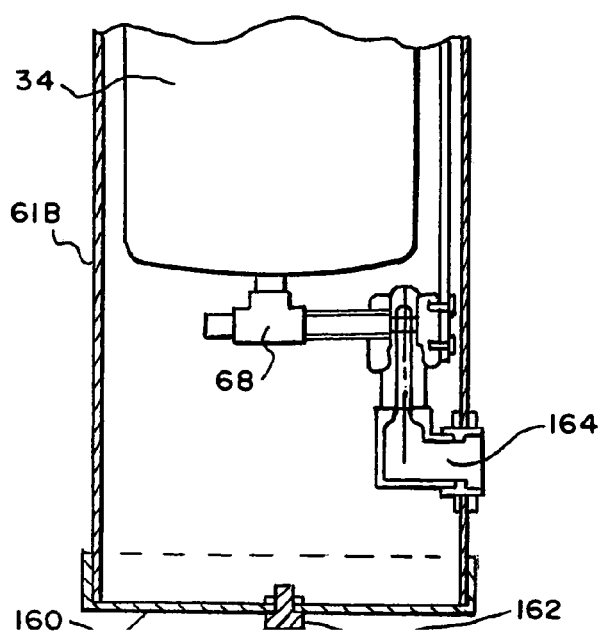
FIG. 12 is a fragmentary elevational simplified sectional view of still another embodiment of the invention having a housing wall different from that of the housing wall of FIG. 4.

In FIG. 12, there is shown a fragmentary, simplified elevational, sectional view of another embodiment of housing with cylindrical open ended PVC sidewalls 61B and an end cup shaped fitting 160 of PVC fitted and sealed to it to form a closed bottom. A drain valve 162 closes the end and permits drainage. In this embodiment, an "L" joint extends outside of the side wall 61 B for connection to the water supply and drop tube (not shown in FIG. 12) in a manner known in the art. The valve 162 includes a check valve with geotextile on the bottom to prevent valve blockage and backflow. It is held in place with a self sealing lock nut.

Figure 13:
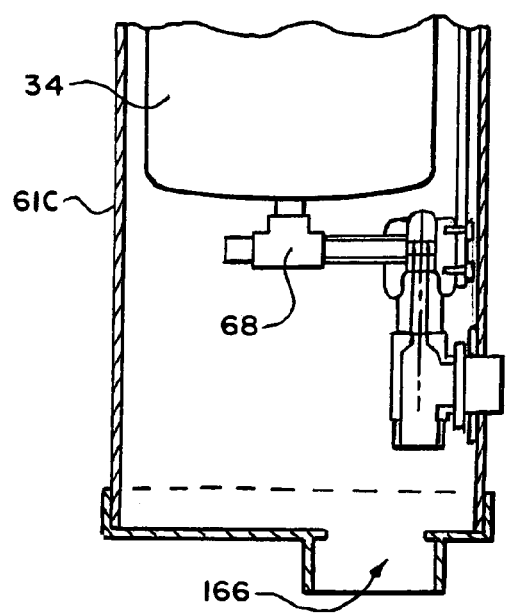
FIG. 13 is a fragmentary elevational simplified sectional view of still another embodiment of the invention having a housing wall different from that of the housing wall of FIG. 4.

In FIG. 13, there is shown a fragmentary, simplified, elevational, sectional view of still another embodiment of housing similar to the housing of FIG. 12 but having the open reduced portion 166 to accommodate the drop tube. It may be formed in a manner similar to that of FIG. 12.

In some instances, installers may wish to install a housing themselves but purchase the parts for completing any of the above embodiments from a manufacturer. They may for example purchase a kit including a water tight cap with a plate to mount a control or status box, a pull strap, tank nipple, tank nut, brass nipple, brass tee and pressure tank for assembling into a complete pitless module. In this case, the installer may provide his or her own module housing or use a housing already in place and convert it in accordance with the invention using the purchased kit.

In use, the module housing and tank are fabricated or otherwise obtained and brought to the site. The housing with the pitless adapter 36 in place is inserted in an excavation and connected to the well casing 75 with the pitless adapter 36 mounted to the casing 75 and tightened there against. The drop tube 71 is then threaded into either the cycle stop valve 52 in the embodiment of FIG. 2 and FIG. 4 or into the bottom portion of the T-connector 98 in the embodiment of FIG. 7. A connecting member 53 connects the cycle stop valve 52 to the T-connector 98 in the embodiment of FIG. 4.

In both embodiments, the submersible pump and pump motor are connected to the drop tube 71 in a manner known in the art so as to enable them to be dropped into the water within the well casing. In the embodiment of FIG. 4, the pitless adapter 36 has a stand pipe 70 threaded into the top so as to lower it into a sealing relationship with the pitless adapter 36 and form a channel between the connecting member 53 and the channel 104 (FIG. 8) that is connected to the plumbing system 14 (FIG. 1). In the embodiment of FIG. 8, the stand pipe 70 is preferably connected to the externally threaded portion 126 of the pressure tank connector 118. In either case, the drop tube 71 is lowered into place and a communication and connection is made with the pitless adapter 36.

In the embodiment of FIG. 4, the pressure tank 34 is dropped with the drop tube 71 and pitless adapter 36 into place in communication with the opening 38. In the embodiment of FIG. 9, the pressure tank 34 is connected to the slip joint member 116 which is lowered by the strap 110 to rest on the pressure tank connector 118 and forms a sealing connection between the interior of the pressure tank 34 and the channel 104 leading to the plumbing system 14 (FIG. 1).

While the embodiment of FIG. 9 is described as having the flow rate control by a cycle stop valve 52 and in the embodiment of FIG. 7 is shown and described as having the flow rate controlled by a pressure transducer 40 and a variable flow rate motor, the cycle stop valve 52 and variable frequency motor are interchangeable between the two embodiments. The variable flow rate embodiments are desirable because they permit a smaller pressure tank to be used than in the prior art by being able to adjust the flow rate to usage and thus require less storage within the pressure tank.

As can be understood from the above detailed description, the water supply system of this invention has several advantages such as: (1) it is economical to install; (2) it is economical to maintain and has easy access to all of its parts; and (3) it is economical in construction.

Although a preferred embodiment of the invention has been described with some particularity, many modifications and variations of the invention are possible within the light of the above teachings. Therefore, it is to be understood that, within the scope of the appended claims, the invention may be practiced other than as specifically described.

What is claimed is:
1. A water supply system having:
a housing;
a pressure tank;
said housing having an enlarged portion and a reduced portion;
said enlarged portion of said housing and said pressure tank being sized so that the pressure tank fits within the enlarged portion of the housing;
said enlarged portion of said housing having an enlarged portion bottom surface;
said reduced portion of said housing having a reduced portion bottom surface;
said reduced portion of said housing being integrally formed with said enlarged portion bottom surface and extending downwardly therefrom;
a conduit adapted to be connected to a pumping system within a well casing extending through the reduced portion bottom surface;
means for supplying water to the pressure tank;
means for regulating pressure in the pressure tank; and
means for supplying water from the pressure tank to a plumbing system.

2. A water supply system in accordance with claim 1 in which the reduced portion of the housing, the enlarged portion bottom surface and the reduced portion bottom surface are wrought metal and the enlarged portion bottom surface slopes downwardly to the reduced portion of the housing.

3. A water supply system in accordance with claim 2 in which at least the enlarged portion bottom surface, the reduced portion and the reduced portion bottom surface are galvanized metal.

4. A water supply system in accordance with claim 3 in which at least the enlarged portion bottom surface, the reduced portion and the reduced portion bottom surface are forged metal.

5. A water supply system in accordance with claim 3 in which at least the enlarged portion bottom surface, the reduced portion and the reduced portion bottom surface are swedged metal.

6. A water supply system in accordance with claim 1 in which the reduced portion of the housing, the enlarged portion bottom surface and the reduced portion bottom surface are PVC and the enlarged portion bottom surface is integrally formed with the reduced portion of the housing.

7. A water supply system in accordance with claim 1 in which the enlarged portion bottom surface is a substantially horizontal surface.

8. A water supply module, comprising:
a housing;
a pressure tank having a capacity of less than 40 gallons;
said housing having an enlarged portion and a reduced portion;
said pressure tank being mounted within said enlarged portion of said housing;
said enlarged portion of said housing having an enlarged portion bottom surface;
said reduced portion of said housing having a reduced portion bottom surface;
said reduced portion of said housing being integrally formed with said enlarged portion bottom surface and extending downwardly therefrom;
a conduit adapted to be connected to a pumping system within a well casing extending through the reduced portion bottom surface for supplying water to the pressure tank; and
means for supplying water from the pressure tank to a plumbing system.

* * * * *